(12) United States Patent
Chandra et al.

(10) Patent No.: US 11,838,989 B1
(45) Date of Patent: Dec. 5, 2023

(54) REDUCING SCOPE OF SERVICE OF RELAY IN RESPONSE TO DONOR ACCESS NODE AIR-INTERFACE LOAD

(71) Applicant: Sprint Spectrum L.P., Overland Park, KS (US)

(72) Inventors: Amrit K. Chandra, Ashburn, VA (US); Liang Li, Germantown, MD (US); Chuck A. Manganiello, Paola, KS (US); Kristian K. Johns, Ashburn, VA (US); David Z. Sun, Broadlands, VA (US); Jay Chernoff, Pawleys Island, SC (US); Neehar S. Kulkarni, Herndon, VA (US); Mayur Shirwadkar, Arlington, VA (US)

(73) Assignee: Sprint Spectrum LLC, Bellevue, WA (US)

( * ) Notice: Subject to any disclaimer, the term of this patent is extended or adjusted under 35 U.S.C. 154(b) by 332 days.

(21) Appl. No.: 16/898,080

(22) Filed: Jun. 10, 2020

(51) Int. Cl.
| | |
|---|---|
| *H04W 24/02* | (2009.01) |
| *H04W 84/04* | (2009.01) |
| *H04B 7/26* | (2006.01) |
| *H04W 28/08* | (2023.01) |
| *H04B 7/155* | (2006.01) |
| *H04W 16/26* | (2009.01) |

(52) U.S. Cl.
CPC ...... *H04W 84/047* (2013.01); *H04B 7/15542* (2013.01); *H04B 7/2606* (2013.01); *H04W 16/26* (2013.01); *H04W 24/02* (2013.01); *H04W 28/0983* (2020.05)

(58) Field of Classification Search
None
See application file for complete search history.

(56) References Cited

U.S. PATENT DOCUMENTS

| | | | |
|---|---|---|---|
| 8,509,681 B2 | 8/2013 | Noh et al. | |
| 9,088,926 B2 | 7/2015 | Liu et al. | |
| 10,051,511 B1 * | 8/2018 | Mehta | H04W 28/0284 |
| 10,172,029 B1 * | 1/2019 | Oroskar | H04L 1/08 |
| 10,548,064 B1 | 1/2020 | Marupaduga et al. | |
| 11,258,494 B1 * | 2/2022 | Sitaram | H04W 24/08 |
| 11,432,183 B1 * | 8/2022 | Marupaduga | H04L 5/0098 |
| 2008/0107091 A1 * | 5/2008 | Ramachandran | H04W 40/12 370/338 |
| 2011/0149769 A1 * | 6/2011 | Nagaraja | H04W 52/343 370/252 |
| 2011/0201334 A1 * | 8/2011 | Rosenqvist | H04W 52/40 370/332 |
| 2012/0063417 A1 * | 3/2012 | Redana | H04W 36/22 370/331 |

(Continued)

*Primary Examiner* — Jenkey Van
(74) *Attorney, Agent, or Firm* — Lee & Hayes, P.C.

(57) ABSTRACT

A method and system for controlling configuration of a relay, where the relay has a coverage footprint and provides service on a first air interface having a frequency bandwidth, and where the relay is served by a donor access node over a second air interface on which the donor access node provides service. Per the disclosure, an entity detects that load on the second air interface on which the donor access node provides service is threshold high, and in response to at least that detecting, the relay is made to reduce the coverage footprint of the relay and/or to reduce the frequency bandwidth of the first air interface on which the relay provides service.

19 Claims, 4 Drawing Sheets

(56) References Cited

U.S. PATENT DOCUMENTS

| | | | |
|---|---|---|---|
| 2012/0327794 A1* | 12/2012 | Han | H04W 52/46 |
| | | | 370/252 |
| 2014/0045491 A1 | 2/2014 | Van Phan et al. | |
| 2014/0161438 A1* | 6/2014 | In De Betou | H04B 10/25753 |
| | | | 398/5 |
| 2014/0274064 A1 | 9/2014 | Al-Shalash et al. | |
| 2017/0230880 A1* | 8/2017 | Oroskar | H04W 36/22 |
| 2017/0257866 A1* | 9/2017 | Chaudhuri | H04L 5/001 |
| 2018/0110037 A1 | 4/2018 | Yasukawa et al. | |
| 2018/0220363 A1 | 8/2018 | Hoglund et al. | |
| 2021/0376902 A1* | 12/2021 | Burstrom | H04B 7/0695 |

* cited by examiner

REDUCING SCOPE OF SERVICE OF RELAY IN RESPONSE TO DONOR ACCESS NODE AIR-INTERFACE LOAD

BACKGROUND

A typical wireless communication system includes one or more access nodes, each radiating to define one or more coverage areas, such as cells and cell sectors, in which user equipment devices (UEs) such as cell phones, tablet computers, tracking devices, embedded wireless modules, and other wirelessly equipped communication devices (whether or not user operated), can operate. Further, each access node of the system may then be coupled or communicatively linked with core network infrastructure such as a switch or gateway that provides connectivity with one or more transport networks, such as the public switched telephone network (PSTN) and/or the Internet for instance. With this arrangement, a UE within coverage of the system may thus engage in air interface communication with an access node and thereby communicate via the access node with various remote network entities or with other UEs served by the system.

In general, a wireless communication system may operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

On the downlink and uplink channels, the air interface on each carrier could be configured in a specific manner to define physical resources for carrying information wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resource elements on the example air interface could be reserved for special purposes. For instance, on the downlink, certain resource elements could be reserved to carry synchronization signals that indicate the presence of coverage on the carrier, other resource elements could be reserved to carry broadcast messages specifying system information, and still other resource elements could be reserved to carry a reference signal that UEs could measure in order to determine coverage strength.

OVERVIEW

When a UE enters into coverage of an example network, the UE could search for the strongest available coverage and could detect such coverage provided by an access node on a particular carrier (e.g., detecting a threshold strong reference signal broadcast by the access node on that carrier). The UE could then in engage in random-access and connection signaling, such as Radio Resource Control (RRC) signaling, to establish an RRC connection or the like through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of bearer connectivity between the UE and a core-network gateway system that provides connectivity with a transport network such as the Internet.

Once the UE is so connected and registered, the access node could then serve the UE in a connected mode on the carrier, managing downlink air-interface communication of data to the UE and uplink air-interface communication of data from the UE.

For example, with the air interface described above, when data for the UE arrives at the core network from the transport network, the data could flow to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding through the core network to the transport network.

While so served, the UE may also monitor coverage strength from its serving access node and from adjacent access nodes, to help ensure that the UE is served with sufficiently strong coverage and perhaps with the strongest available coverage. If the UE's coverage from its serving access node becomes threshold weak and if another access node's coverage becomes threshold strong (e.g., threshold stronger than the serving access node's coverage), the UE may engage in signaling with its serving access node, and the serving access node may take action to coordinate handover of the UE to the other access node.

Optimally, a wireless service provider will strategically implement access nodes throughout a market area so that served UEs can transition between the access nodes' coverage areas without loss of coverage. Each access node may include an antenna structure and associated equipment, and the service provider may connect each access node by a landline cable (e.g., fiber backhaul) with the service provider's core network, to enable the access node to communicate on that network.

In certain locations, however, it may be impractical for a wireless service provider to run landline connections to access nodes. For instance, where a service provider seeks to provide many small coverage areas blanketing a market area or to fill in coverage holes between coverage of other access nodes, the service provider may implement many small-cell access nodes throughout the market area, but it may be inefficient or undesirable to run landline cables to every one of those small-cell access nodes.

To provide coverage in such locations, the wireless service provider may instead implement relays, each of which could be configured to operate in much the same way as a conventional landline-connected access node but could have a wireless backhaul connection to a core network. In particular, each relay could include a relay access node and an associated relay-UE module (integrated or communicatively linked together). The relay-UE module, and thus the relay, could then be served by an existing access node of the network, referred to as a donor access node, with the air interface between the relay-UE and the donor access node defining a wireless backhaul connection for the relay. Further, the core network could be equipped with a special relay-gateway system that operates to provide internal core-network connectivity.

When the relay-UE module of a relay enters into coverage of an example donor access node, the relay-UE could operate like a conventional UE to connect with the donor access node and to engage in an attach signaling with the core-network controller. Because the relay-UE is a relay-UE rather than a conventional UE, however, this attach process could result in setup for the UE of bearer connectivity specifically with the relay-gateway system, enabling both the relay-UE and the relay access node to engage in communication within the core network. With this arrangement, the relay could thus conveniently communicate with the core network via the wireless backhaul connection, the donor access node, and the relay-gateway system.

Unfortunately, however, the air interface over which such a donor access node provides wireless service could at times become heavily loaded.

One reason for this heavy load could be that when the donor access node serves a relay, the donor access node's air interface may need to carry both user-plane traffic (e.g., application-layer communications) being communicated to/from the UEs that are served by the relay and control-plane traffic (e.g., control signaling) being communicated to/from the relay itself (e.g., between the relay and other core network entities). Further, the donor access node may serve multiple relays at once, and so its air interface may carry user-plane and control-plane traffic to/from multiple relays concurrently. And still further, the donor access node may also serve end-user UEs (non-relay-UEs) at the same time as it serves one or more relays, and so its air interface may additionally carry user-plane traffic to/from those end-user UEs.

In an example implementation, the donor access node's air interface may define a certain quantity of air interface resources per unit time for carrying communication traffic. For instance, the air interface could be structured as noted above, defining a finite quantity of PRBs and associated resource elements per unit time that can be modulated to carry data representing communications. An example of heavy load on the air interface in this context could involve a threshold high portion of these PRBs and resource elements per unit time being used to carry communications. And given the limited quantity of these resources per unit time, such heavy load on the air interface could cause problems. For instance, the heavy load could result in delayed or blocked communications of user-plane and/or control-plane traffic. Therefore, an improvement is desired.

Disclosed is a method and system to help address this issue.

In accordance with the disclosure, when a donor access node serves a relay over an air interface, a determination will be made that resource utilization on the donor access node's air interface is threshold high (e.g., that the air interface on which the donor access node provides service is threshold heavily loaded), and, in response, the relay will be made to reduce the scope of the relay's service in a manner that allows UEs to still discover coverage of the relay and connect with the relay but that likely reduces the extent to which UEs would do so and therefore likely helps to reduce the associated load on the donor access node's air interface.

By way of example, in response to the determination that the resource utilization on the donor access node's air interface is threshold high, the relay could be made to reduce the geographic size of the relay's coverage area as defined by an antenna pattern of the relay. For instance, depending on the relay's capabilities for dynamic reconfiguration, the relay could be made to reduce its reference-signal transmission power and/or increase the downtilt of its antenna, so as to reduce the radius of its coverage area, and/or to reduce the beamwidth of its antenna pattern, so as to narrow its coverage area. Reducing the size of the relay's coverage area may help to limit the number of UEs that discover coverage of the relay and connect with the relay, and may thereby help to control the associated load on the donor access node's air interface.

As another example, in response to the determination that the resource utilization on the donor access node's air interface is threshold high, the relay could be made to reduce the frequency bandwidth on which the relay is configured to provide service. For instance, if the relay operates on a carrier having a particular frequency bandwidth, the relay could be made to reduce the bandwidth of that carrier. Alternatively or additionally, if the relay is configured to operate on multiple carriers, the relay could be made to discontinue service on a proper subset of those carriers, so as to reduce the aggregate frequency bandwidth on which the relay is configured to provide service. Reducing the frequency bandwidth on which the relay is configured to provide service may reduce the data capacity of the relay's air interface and may thereby also help to control the associated load on the donor access node's air interface.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
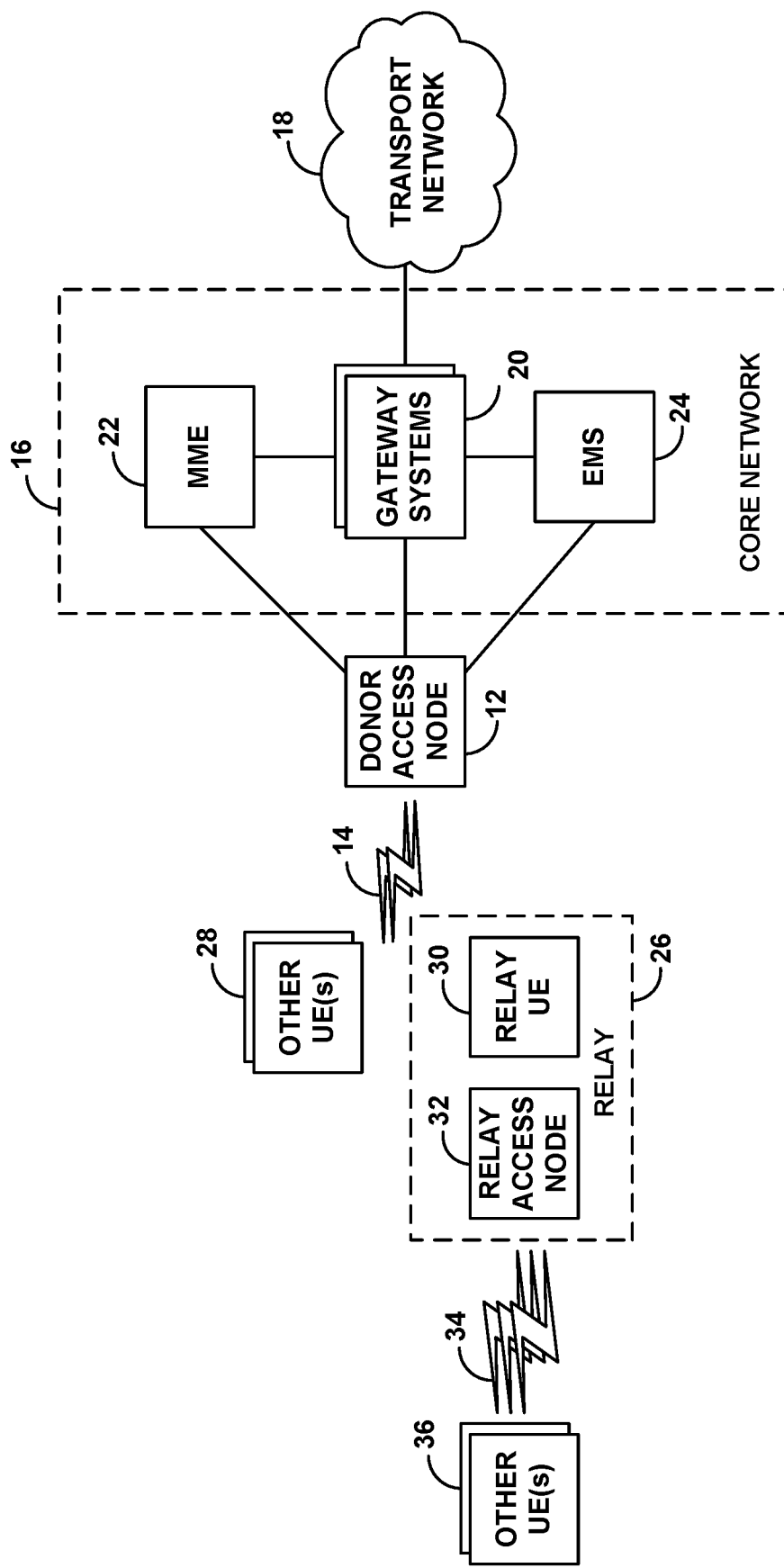
FIG. 1 is a simplified block diagram of an example network arrangement in which features of the present disclosure can be implemented.

An example implementation will now be described in the context of a system operating according to 4G LTE or 5G NR by way of example. It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, as noted above, FIG. 1 is a simplified block diagram of an example wireless communication system in which features of the present disclosure can be implemented. In particular, FIG. 1 depicts a representative network that functions primarily to serve UEs with wireless packet data communication service, including possibly voice-over-packet service, but may also provide other functions.

As shown, the network includes an example donor access node 12, which could be a 4G access node (e.g., evolved Node-B (eNB)) or a 5G access node (e.g., next generation Node-B (gNB)), among other possibilities.

This donor access node 12 could be a macro access node of the type that would typically include a tower mounted antenna structure for providing a broad range of coverage. Or the donor access node could be a small cell access node, femtocell access node, or other type of access node that might have a smaller form factor with an antenna structure that provides a narrower range of coverage. The donor access node 12 could be configured to provide coverage and service on one or more carriers defining an air interface 14 through which the donor access node 12 could serve various UEs.

The example donor access node 12 is also shown interfaced with a core network 16. Core network 16 could be an evolved packet core (EPC) network, a next generation core (NGC) network, or another network including components supporting an applicable RAT and could provide connectivity with at least one transport network 18, such as the Internet. Further, the core network 16 could be a packet-switched network, compliant with the industry standard system architecture evolution (SAE) or another protocol, and thus various entities that communicate on the core network could each have an assigned Internet Protocol (IP) address and be configured to communicate with each other over packet-based tunnels or other communication interfaces.

In the example arrangement shown, the core network 16 includes gateway systems 20, a management entity (MME) 22, and an element management system (EMS) 24. As shown, the donor access node could have interfaces with the gateway systems 20, with the MME 22, and with the EMS 24, and the gateway systems could have interfaces with the MME 22 and with the EMS 24.

With this arrangement, one of the gateway systems 20 could be a conventional gateway system that provides connectivity with the external transport network 18, and another of the gateway systems 20 could be a relay-gateway system as discussed above that provides internal core-network connectivity to facilitate relay service. Further, the MME 22 could operate as a core-network controller to carry out operations such as coordinating UE attachment and setup bearer connectivity. And the EMS 24 could be an example of a computing-system platform configured to operate as a central repository of operational data for the wireless communication system and to control and manage operation of various network elements.

Shown being served by the donor access node 12 on air interface 14 is a representative relay 26, as well as possibly one or more other UEs (e.g., end-user UEs and/or other relays) 28.

The relay 26 is shown including a representative relay-UE 30 and a representative relay access node 32, which could be integrated and/or communicatively linked together. In line with the discussion above, the donor access node 12 in this arrangement could thus serve the relay 26 by serving the relay-UE 30 in much the same way that an access node would serve any UE. Further, the relay-UE 30 could interface with the relay access node 32.

Like the donor access node 12, the relay access node 32 could take various forms, though a typical relay access node may be a small cell access node. As shown, the relay access node 32 could be configured to provide coverage and service on one or more carriers defining an air interface 34 through which the relay access node 32 could serve one or more other UEs (e.g., end-user UEs and/or other relays) 36.

In an example implementation, the air interface 14 of the donor access node and the air interface 34 of the relay access node 32 could each be structured as discussed above, or they could be structured in other ways and differently than each other, possibly using different RATs than each other. In any event, the air interface between each access node and UEs within the access node's coverage could be structured to define various air-interface resources.

By way of example, in the time domain, the air interface could define a continuum of 10-millisecond (ms) frames, each divided into a number of subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define the array of resource elements noted above. And sets of these resource elements on the air interface could be grouped together to define the PRBs per unit time as noted above.

In addition, as noted above, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could carry scheduled data communications from the access node to UEs.

Further, in certain subframes, a group of resource elements centered on the center frequency of each carrier could be reserved to carry synchronization signals that UEs could detect as a way to discover coverage of the access node on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the downlink bandwidth per subframe could be reserved to carry the reference signal noted above, which UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

To facilitate providing service on such an air interface, each access node could be equipped with one or more antennas, power amplifiers and associated circuitry, cooperatively enabling the access node to transmit and receive electromagnetic signals in a region defined by an antenna pattern.

The antenna pattern of an access node could define a coverage footprint in which the access node can engage in downlink transmission to UEs and receive uplink transmission from UEs. Such an antenna pattern could have a main lobe and could be characterized by an azimuth angle, an elevation angle, a beamwidth, and a radius. In polar coordinates, the azimuth angle could define a direction of radiation of the main lobe within a horizontal plane, as an angle of rotation around a vertical axis (in relation to North (zero degrees) for instance), the elevation angle could define a direction of radiation of the main lobe within a vertical plane, as an angle of rotation around a horizontal axis (in relation to the horizon for instance), and the beamwidth could define an angular width of the main lobe within the horizontal plane, typically measured between half-power (−3 dB) points of the main lobe for instance. Further, the radius of the antenna pattern could define the effective distance of radiation from the access node as measured at a ground plane for instance, among other possibilities.

In an example arrangement, the donor access node 12 and the relay access node 32 could each operate as standard access nodes from the perspective of UEs that they serve. As such, a UE that enters into coverage of either access node could detect threshold strong coverage of the access node on a given carrier and could then engage in signaling to acquire wireless connectivity with the access node on that carrier and, if appropriate, to attach or register for service with the network. This could happen initially when a UE first powers on within the access node's coverage or perhaps later as the UE is scanning for possible handover from another coverage area.

In practice, for instance, the UE could scan for broadcast of a synchronization signal at various carrier center frequencies. And upon detecting such a synchronization signal broadcast by an access node on a carrier, the UE could thereby determine frame timing for communicating with the access node and could then read a MIB broadcast by the access node on the carrier and thereby determine the bandwidth of the carrier. Further, the UE could evaluate the reference signal broadcast by the access node on the carrier to determine coverage strength of the access node. And if the UE determines that the coverage strength is sufficiently high, the UE could then engage in random-access signaling and RRC signaling with the access node to connect with the access node on the carrier. Further, the UE could engage in attach signaling via the access node with the MME 22.

When a UE so connects with an access node, the air interface over which the access node then serves the UE could encompass just the one carrier on which the UE connected with the access node. Further, if the access node and UE support carrier-aggregation service, the access node might also add to the UE's connection one or more additional carriers, so that the air interface over which the access node then serves the UE could encompass the multiple carriers. Carrier-aggregation service could beneficially help provide a UE with increased peak data rate of communication by increasing the aggregate frequency bandwidth and associated capacity of the air interface on which the UE is served.

In line with the discussion above, when a conventional (non-relay) UE 28 connects with access node 12 and attaches, the MME 22 could coordinate setup for the UE 28 of bearer connectivity with the conventional gateway system, to provide the UE with external transport-network connectivity. Whereas, when the relay-UE 30 connects with the donor access node 12 and attaches, the MME 22 could coordinate setup for the relay-UE of bearer connectivity with the relay-gateway system, to enable the relay-UE 30 and the relay access node 32 to communicate internally in the core network. Further, when a conventional UE 36 connects with the relay access node 32 and attaches, the MME 22 could also coordinate setup for the UE 36 of bearer connectivity with the convention gateway system, to provide the UE with external transport network connectivity.

With this arrangement, as noted above, various user-plane and control-plane communications associated with operation of the relay access node 32 could flow over the donor access node's air interface 14 between the relay-UE 30 and the donor access node 12. Without limitation, this could include attach signaling and other control signaling between relay access node's served UEs 36 the MME 22 as well as user-plane communication between those UEs 36 and the conventional gateway system, and control signaling between the relay access node 32 and various core network entities. To facilitate this and other communication traffic over air interface 14, the donor access node 12 could schedule use of PRBs on the air interface 14 as discussed above.

As further noted above, however, the donor access node's air interface 14 in this arrangement (for instance) could become heavily loaded as a result of the air interface 14 carrying all of this communication traffic. And as noted above, given the finite capacity of the donor access node's air interface 14, at some point the level of communication traffic on the donor access node's air interface 14 could create issues. For instance, given a threshold high level of load on the donor access node's air interface 14, the air interface 14 may have insufficient capacity to transmit certain control-plane and/or user-plane traffic, which could result in delayed, blocked, and/or dropped communications and could prevent timely signaling between the relay access node and other network entities, resulting in still other issues.

To help address this scenario, as noted above, the present disclosure provides for determining that the donor access node's air interface is threshold highly loaded and responsively taking action to help limit, reduce, or otherwise control load on the donor access node's air interface. Namely, in response to detecting the threshold high level of load on the donor access node's air interface, the relay 26 (particularly the relay access node 32) could be made to reduce the scope of its service while still continuing to provide service. As noted above, for instance, in response to the determination that resource utilization on the donor access node's air interface is threshold high, the relay 26 could take action to reduce the size of its coverage footprint and/or to reduce the number of carriers on which the relay 26 is configured to provide service, so as to likely reduce the extent to which UEs would connect with the relay and therefore likely help reduce the associated load on the donor access node's air interface 14.

To facilitate this process in an example implementation, the donor access node 12 could regularly determine and report to the EMS 24 the level of load on the donor access node's air interface 14, and when that level of load reaches a threshold high level, the EMS 24 could then responsively signal to the relay access node 32 to cause the relay access node 32 to reduce the relay access node's scope of service.

The donor access node 12 could determine the level of load on its air interface 14 in various ways. Without limitation, for instance, the donor access node 12 could determine the level of load on its air interface 14 as a percentage of the air interface's total number of PRBs that the donor access node 12 allocates per unit time, on the downlink and/or the uplink. For example, if the donor access node's air interface 14 defines 100 PRB per subframe, at issue could be what percentage of those 100 PRBs are allocated per subframe. The donor access node 12 could conduct this evaluation over a sliding window of time, averaging the measure over a number of subframes, among other possibilities.

The donor access node 12 could regularly report its determined level of load of its air interface 14 to the EMS 24 periodically or perhaps in response to determining that the level of load has reached a threshold high level. In the arrangement of FIG. 1, the donor access node 12 could report this information to the EMS 24 over the interface defined in the core network between the donor access node 12 and the EMS 24.

To facilitate taking action based on this information from the donor access node 12, the EMS 24 could be provisioned with an indication that the donor access node's air interface 14 functions as a wireless backhaul interface for the relay access node 32. In practice, for instance, the relay-gateway system could report this relationship to the EMS 24 when the relay-UE 30 attaches and bearer connectivity is established for the relay access node 32. Or the EMS 24 could otherwise learn the relationship between the donor access node 12 and the relay access node 32.

Based on the latest information indicating the level of load of the donor access node's air interface 14, the EMS 24 could then determine if that level of load is at least as high as a predefined threshold level of load. The predefined threshold level could be a level in the range of 75% to 90% and/or could be any threshold level that is deemed by engineering design and/or operational data to be problematic.

If and when the EMS 24 determines that the level of load on the donor access node's air interface 14 is threshold high, the EMS 24 could then responsively signal to the relay access node 32 to cause the relay access node 32 to reduce its scope of service. In the arrangement of FIG. 1, for instance, the EMS 24 could signal to the relay access node 32 through the relay-gateway system. Namely, the EMS 24 could transmit a signaling message to the relay access node 32, and the signaling message could be routed through the relay-gateway system, the donor access node 12, air interface 14, and the relay-UE 30, to the relay access node 32.

This signaling message from the EMS 24 to the relay access node 32 could be interpretable by the relay access node 32 to cause the relay access node 32 to take action in response to reduce the scope of service of the relay access node 32. For instance, the relay access node 32 could include a processing unit that is programmed to receive and respond to the signaling message from the EMS 24. Thus, in response to receipt of this signaling message, the relay access node 32 could take such action.

Note also that the signaling message could include an indication of the determined level of load of the donor access node's air interface, and the relay access node 32 could reduce its scope of service to an extent based on how loaded the donor access node's air interface is. For instance, if the level of load on the donor access node's air interface is substantially higher than the threshold level, then the relay access node 32 could more substantially reduce its scope of service, and if the level of load on the donor access node's air interface is just slightly higher than the threshold level, then the relay access node 32 could less substantially reduce its scope of service.

As discussed above, in response to the signaling message and/otherwise in response to the determination that the donor access node's air interface is threshold heavily loaded, the relay access node 32 could reduce the scope of its service by reducing its coverage footprint.

In an example implementation, the relay access node 32 could be equipped to dynamically reconfigure its coverage footprint by dynamically changing its antenna pattern so as to change the geographic or spatial scope of its coverage. For instance, the relay access node 32 might include control logic and/or other components that enable the relay access node 32 to dynamically adjust its transmission power, number of active antennas, and/or antenna downtilt, so as to change the radius of its antenna pattern, and/or to adjust signal phases, antenna orientations, and/or other characteristics so as to change the beamwidth of its antenna pattern.

In response to the determination that the donor access node's air interface is threshold loaded, the relay access node 32 might reduce the transmission power at which the relay access node broadcasts a synchronization signal and/or a reference signal on at least one carrier. In this way, the relay access node 32 could effectively reduce the radius of its coverage, a those broadcast signals would not extent as far from the relay access node 32 as they normally would. UEs that are distant from the relay access node 32 and might otherwise detect those signals and seek to connect with the relay access node 32 may therefore not be able to detect those signals and therefore not connect with the relay access node 32. But optimally, by reducing the power of those such signals rather than turning them off altogether, the relay access node 32 could still enable UEs that are sufficiently close to the relay access node 32 to discover service and connect with the relay access node 32.

Alternatively or additionally, in response to the determination that the donor access node's air interface is threshold loaded, the relay access node 32 might be able to achieve a similar effect by increasing its antenna downtilt, i.e., tilting its antenna more toward ground. Increasing the antenna downtilt in a typical arrangement could likewise result in decreased radius of coverage of the relay access node 32, similarly preventing more distant UEs from connecting with the relay access node. Other parameter, signaling, software, or hardware changes might be applied to achieve the same effect as well.

Still alternatively or additionally, in response to the determination that the donor access node's air interface is threshold loaded, the relay access node 32 might reduce its coverage footprint by narrowing the beamwidth of its antenna pattern. For instance, through adjustments of signaling phases or physical adjustment of antenna elements, the relay access node 32 might change the beamwidth of its antenna pattern to be a narrower beamwidth. This reconfiguration could thereby result in UEs that are farther away from the relay access node's azimuth being unable to detect and connect with the relay access node 32 while still allowing UEs that are closer to the relay access node's azimuth to detect and connect with the relay access node 32. This implementation could be suitable for a relay access node 32 that provides coverage in a specific direction rather than providing omnidirectional coverage.)

As further discussed above, in response to the determination that the donor access node's air interface is threshold heavily loaded, the relay access node 32 could reduce the frequency bandwidth on which the relay access node 32 provides service, so as to reduce the air-interface capacity available to serve UEs and thereby to help reduce the level of load on the donor access node's air interface. The relay access node 32 could do this in various ways.

By way of example, as to a given carrier on which the relay access node 32 is configured to provide coverage, the relay access node 32 could reduce the frequency bandwidth of its service by reducing the frequency bandwidth of the carrier. For instance, if the carrier has a bandwidth of 20 megahertz (MHz), the relay access node 32 might reduce the bandwidth of the carrier to 15 MHz or 10 MHz. The relay access node 32 could accomplish this by changing the frequency bandwidth indicated in the MIB that the relay access node 32 broadcasts on the carrier, and notifying any served UEs of the change. Further, this reduction in bandwidth of the carrier could involve removing portions of the bandwidth from both the low-end and high-end of the carrier, so as to maintain the center frequency of the carrier.

As another example, if the relay access node 32 provides service on multiple carriers, the relay access node 32 could reduce the frequency bandwidth of its service by reducing the number of carriers on which the relay access node 32 provides service. Namely, the relay access node 32 can discontinue service on a proper subset of the multiple carriers on which the relay access node 32 is configured to operate. For instance, if the relay access node 32 is configured to provide service on three carriers, the relay access node 32 could discontinue its service on one or two of those carriers, while continuing to provide service on the remaining carrier(s). The relay access node 32 could discontinue providing service on a given carrier by stopping its transmission and reception on that carrier, among other possibilities. Optimally, the relay access node 32 could first transition any UEs served on such a carrier to one or more other carriers or access nodes.

Further, as a related example, if the relay access node 32 provides service on multiple carriers and supports carrier-aggregation service, the relay access node 32 could reduce the frequency bandwidth of its service by restricting the extent to which the relay access node 32 provides carrier-aggregation service. For instance, the relay access node 32 could set itself to not provide carrier-aggregation service by no longer adding secondary carriers for service of any UEs that the relay access node 32 serves, and/or if the relay access node 32 is serving one or more UEs with carrier-aggregation service, the relay access node 32 could discontinue scheduling communications on secondary carrier(s) of that service. Still alternatively, the relay access node 32 could start imposing a stringent limitation on the number of UEs or classes of UEs that could receive carrier-aggregation service.

These or other such reductions of scope of service by the relay access node 32 could also be temporary. For example, the relay access node 32 could automatically revert to its normal scope of service upon expiration of a predefined time period after reducing the scope of its service. Or the relay access node 32 could automatically revert to its normal scope of service upon receipt of a similar signaling message responsively to a determination (e.g., by the EMS 24) that the donor access node's air interface is no longer threshold highly loaded, possibly applying hysteresis to help avoid ping pong between its reduced and normal scopes of coverage.

Note also that, in response to the determination that the donor access node's air interface is threshold heavily loaded, the relay access node could additionally be made to carry out one or more other operations that could help control the load on the donor access node's air interface. Without limitation, for instance, as described by U.S. Pat. No. 10,548,064 (hereby incorporated herein by reference), in response to the determination that the donor access node's air interface is threshold heavily loaded, the relay access node could be made to temporarily discontinue broadcasting of system messaging on the first air interface, so as to prevent any UEs from newly acquiring connectivity with the relay access node over the first air interface.

Further, note that, while the above discussion describes the EMS 24 being involved in this process, similar operations could be carried out in other ways possibly not involving the EMS 24. For instance, the relay gateway system might carry out various functions discussed above as being carried out by the EMS 24. Or the donor access node 12 might more directly communicate with the relay access node 32 to inform the relay access node 32 when the donor access node's air interface is threshold highly loaded, so as to cause the relay access node 12 to responsively reduce its scope of service. For instance, the donor access node 12 might signal to the relay access node 32 over an inter-access-node interface that extends from the donor access node 12 to the relay gateway system, from the relay gateway system via the donor access node 12 and air interface 14 to the relay-UE 30, and from the relay-UE 30 to the relay access node 32. Other examples could be possible as well.

Figure 2:
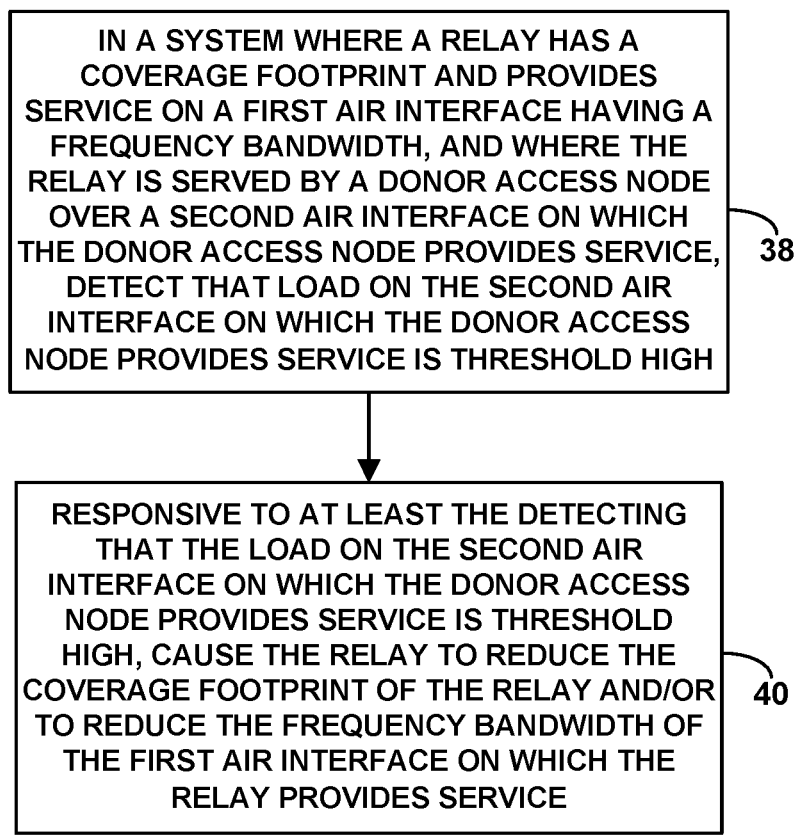
FIG. 2 is a flow chart depicting an example method in accordance with the present disclosure.

FIG. 2 is a flow chart illustrating a method that can be carried out in accordance with the present disclosure, to control configuration of a relay (e.g., a relay access node), in a scenario where the relay has a coverage footprint and provides service on a first air interface having a frequency bandwidth, and where the relay is served by a donor access node over a second air interface on which the donor access node provides service.

As shown in FIG. 2, at block 38, the method includes detecting that load on the second air interface on which the donor access node provides service is threshold high. And at block 40, the method includes, responsive to at least the detecting that the load on the second air interface on which the donor access node provides service is threshold high, causing the relay to reduce the coverage footprint of the relay and/or to reduce the frequency bandwidth of the first air interface on which the relay provides service. Either or both of these actions would thus reduce the scope of service provided by the relay, and the relay could continue to provide service with the reduced scope.

In line with the discussion above, the act of detecting that load on the second air interface on which the donor access node provides service is threshold high could be carried out by a core-network computing system (e.g., the EMS 24) based on reporting from the donor access node, and the act of causing the relay to perform the at least one action could then involve that computing system signaling to the relay to cause the relay to perform the at least one action. Alternatively, as discussed above, the act of detecting that load on the second air interface on which the donor access node provides service is threshold high could be done by the donor access node, and the act of causing the relay to perform the at least one action could then involve signaling from the donor access node to the relay to cause the relay to perform the at least one action.

As further discussed above, the second air interface on which the donor access node provides service could include at least one carrier and could define air-interface resources for carrying communications, and the act of detecting that load on the second air interface is threshold high could involve detecting that at least a predetermined threshold high portion of the air-interface resources are used. Here, for instance, the air-interface resources could be PRBs whose use is scheduled by the donor access node.

In addition, as discussed above, the action that relay is caused to perform responsive to at least the detecting that the load on the second air interface on which the donor access node provides service is threshold high could specifically include reducing the coverage footprint of the relay, perhaps temporarily. For instance, as discussed above, this could involve an action such as (i) reducing transmission power of the relay, (ii) increasing an antenna downtilt of the relay, (iii) narrowing a beamwidth of the relay, and (iv) reducing a quantity of antennas used by the relay. As to reducing transmission power of the relay, for example, the action could involve reducing transmission power that the relay uses for transmission of a synchronization signal and/or a reference signal, while continuing to broadcast those signals to enable UEs to newly connect with the relay.

Alternatively or additionally, the action that the relay is caused to perform responsive to at least the detecting that the load on the second air interface on which the donor access node provides service is threshold high could specifically include reducing the frequency bandwidth of the first air interface on which the relay provides service, perhaps temporarily. For instance, as discussed above, if the relay provides service on at least one carrier having a first frequency bandwidth, then reducing the frequency bandwidth on which the relay provides service could involve reducing the frequency bandwidth of the at least one carrier from the first frequency bandwidth to a second frequency bandwidth that is narrower than the first frequency bandwidth. And if the relay provides service on multiple carriers, then reducing the frequency bandwidth on which the relay provides service could involve discontinuing the relay's service on a proper subset of the multiple carriers and/or limiting an extent to which the relay provides carrier-aggregation service.

Still further, an additional feature as described above could be responding to at least the detecting that the load on the second air interface on which the donor access node provides service is threshold high by causing the relay to temporarily discontinue broadcasting system messaging on the first air interface, so as to prevent any user equipment devices (UEs) from newly acquiring connectivity with the relay over the first air interface.

Figure 3:
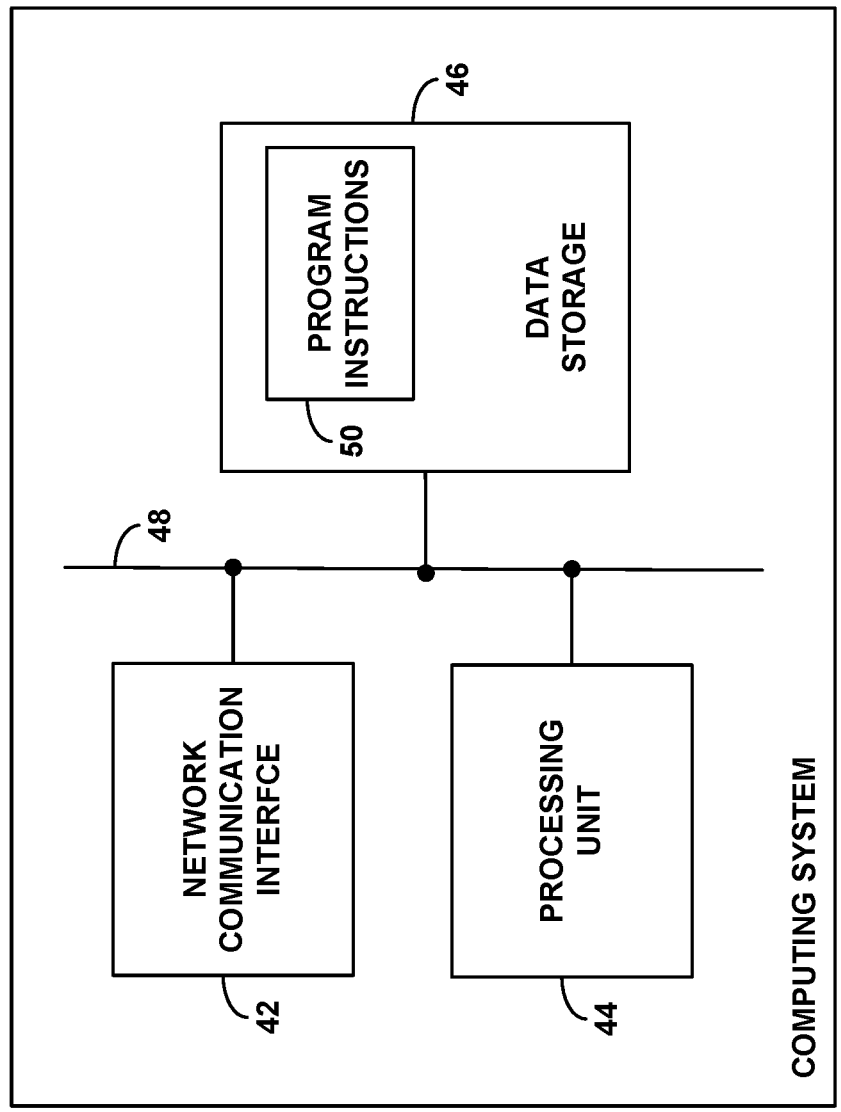
FIG. 3 is a simplified block diagram of an example computing system operable in accordance with the present disclosure.

FIG. 3 is next a simplified block diagram of an example computing system that could carry out various features as described above. As noted above, this computing system could be the EMS 24, among other possibilities. As shown in FIG. 3, the computing system includes a network communication interface 42, a processing unit 44 and non-transitory data storage 46, which could be integrated or communicatively linked together by a system bus, network, or other connection mechanism 48.

The network communication interface 42 could comprise a wired or wireless network communication module, such as an Ethernet interface, through which the computing system can communicate with other entities. And the processing unit 44 could comprise one or more processors (e.g., one or more general purpose processors and/or specialized processors), such as one or more microprocessors or specialized processors.

The non-transitory data storage 46 could comprise one or more volatile and/or non-volatile storage components, such as magnetic, optical, or flash storage media. And as further shown, the data storage 46 could hold, store, encode, or otherwise embody program instructions 50. In a representative implementation, those program instructions 50 could be executable by the processing unit 44 to carry out various features described herein such as those described with respect to FIG. 2 for instance.

Figure 4:
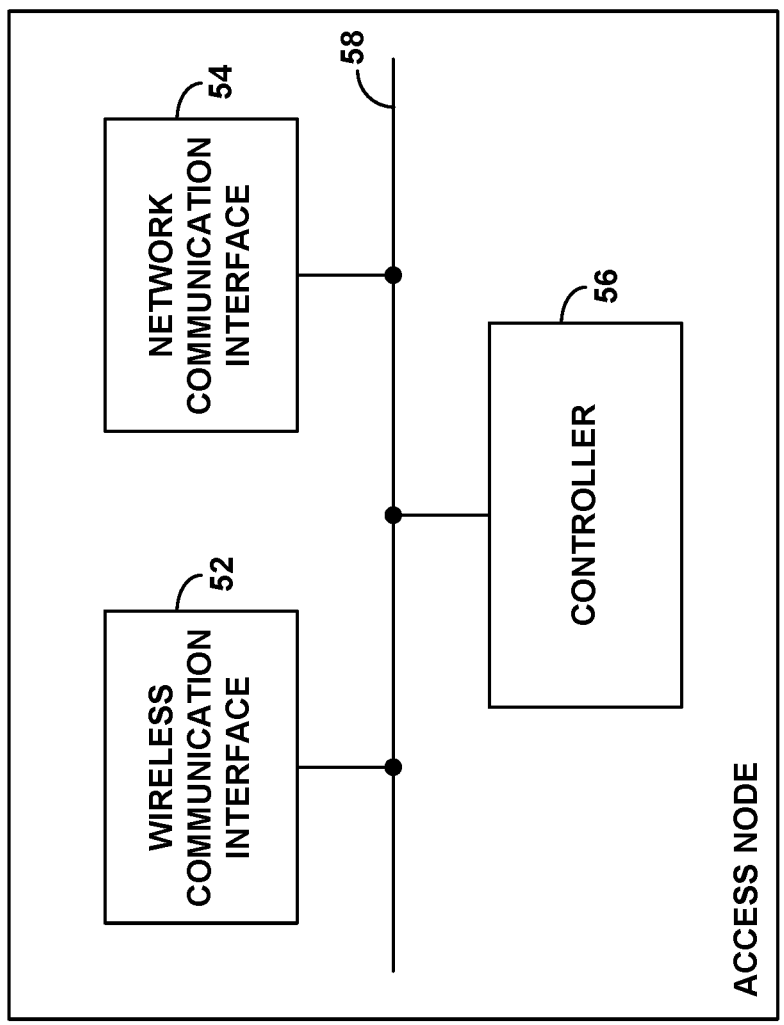
FIG. 4 is a simplified block diagram of an example access node operable in accordance with the present disclosure.

Finally, FIG. 4 is a simplified block diagram of an example access node, such as donor access node 12 discussed above for instance. This access node is operable in a wireless communication system in which a relay has a coverage footprint and provides service on a first air interface, and in which the access node is configured to serve the relay over a second air interface on which the access node provides service.

As shown, the example access node includes a wireless communication interface 52 through which to engage in communication with UEs served by the access node, a network communication interface 54 through which to engage in communication with other access nodes and with various network infrastructure, and a controller 56 configured to cause the access node to carry out various access node operations described herein, with these various components being integrated or communicatively linked together by a system bus, network, or other connection mechanism 58.

In an example implementation, the wireless communication interface 52 could include a transceiver configured to serve UEs in accordance with one or more RATs such as those noted above, along with a power amplifier and antenna structure that radiates to provide for air interface communication between the access node and served UEs. The network communication interface 54 could then comprise a wired or wireless network communication module, such as an Ethernet interface, through which the access node can communicate with other entities.

The controller 56 could also take various forms, including various combinations of hardware, firmware, and software for instance. By way of example, the controller could comprise one or more general purpose processors (e.g., microprocessors) and/or one or more special purpose processors (e.g., application specific integrated circuits), and one or more non-transitory data storage elements (e.g., magnetic, optical, and/or flash storage). The data storage could then hold program instructions executable by the processor(s) to carry out various access node functions described herein, and could further hold various reference data.

In an example implementation, the controller 56 could thus be arranged to (a) detect that resource utilization on the second air interface on which the access node provides service is threshold high and (b) responsive to at least the detecting that the resource utilization on the second air interface on which the access node provides service is threshold high, cause the relay to (i) reduce the coverage footprint of the relay and/or (ii) reduce the frequency bandwidth of the first air interface on which the relay provides service. Further, as noted above, the relay could then continue to provide service after performing the action.

Various features described above can be implemented in this context, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

We claim:

1. A method of controlling configuration of a relay, wherein the relay has a coverage footprint and provides service on a first air interface having a frequency bandwidth, and wherein the relay is served by a donor access node over a second air interface on which the donor access node provides service, the method comprising:
   detecting that load on the second air interface on which the donor access node provides service is threshold high, wherein the second air interface on which the donor access node provides service comprises at least one carrier and defines air-interface resources for carrying communications, and wherein detecting that load on the second air interface is threshold high comprises detecting that at least a predetermined threshold high percentage of the air-interface resources are used per unit time; and
   responsive to at least the detecting that the load on the second air interface on which the donor access node provides service is threshold high, causing the relay to perform at least one action comprising reducing the frequency bandwidth of the first air interface on which the relay provides service, wherein the relay continues to provide service after performing the at least one action.

2. The method of claim 1, wherein detecting that load on the second air interface on which the donor access node provides service is threshold high is carried out by a core-network computing system based on reporting from the donor access node, and wherein the causing of the relay to perform the at least one action comprises the computing system signaling to the relay to cause the relay to perform the at least one action.

3. The method of claim 1, wherein the detecting that load on the second air interface on which the donor access node provides service is threshold high is done by the donor access node, and wherein the causing of the relay to perform the at least one action comprises signaling from the donor access node to the relay to cause the relay to perform the at least one action.

4. The method of claim 1, wherein the air-interface resources are physical resource blocks whose use is scheduled by the donor access node.

5. The method of claim 1, wherein the at least one action that the relay is caused to perform responsive to at least the detecting that the load on the second air interface on which the donor access node provides service is threshold high further comprises reducing the coverage footprint of the relay.

6. The method of claim 5, wherein reducing the coverage footprint of the relay comprises an operation selected from the group consisting of (i) reducing transmission power of the relay, (ii) increasing an antenna downtilt of the relay, (iii) narrowing a beamwidth of the relay, and (iv) reducing a quantity of antennas used by the relay.

7. The method of claim 5, wherein reducing the coverage footprint of the relay comprises reducing transmission power that the relay uses for transmission of a signal selected from the group consisting of a synchronization signal and a reference signal, wherein the relay continues to transmit the signal to enable user equipment device(s) to newly connect with the relay.

8. The method of claim 5, wherein the reducing of the coverage footprint of the relay is temporary.

9. The method of claim 1, wherein the relay provides service on at least one carrier having a first frequency bandwidth, and wherein reducing the frequency bandwidth on which the relay provides service comprises reducing the frequency bandwidth of the at least one carrier from the first frequency bandwidth to a second frequency bandwidth narrower than the first frequency bandwidth.

10. The method of claim 1, wherein the relay provides service on multiple carriers, and wherein reducing the frequency bandwidth on which the relay provides service comprises discontinuing service by the relay on a proper subset of the multiple carriers.

11. The method of claim 1, wherein the relay is configured to support providing carrier-aggregation service, and wherein reducing the frequency bandwidth on which the relay provides service comprises limiting an extent to which the relay provides the carrier-aggregation service.

12. The method of claim 1, wherein the reducing of the frequency bandwidth is temporary.

13. The method of claim 1, further comprising, responsive to at least the detecting that the load on the second air interface on which the donor access node provides service is threshold high, causing the relay to temporarily discontinue broadcasting system messaging on the first air interface, so as to prevent any user equipment devices (UEs) from newly acquiring connectivity with the relay over the first air interface.

14. A computing system operable to control service of a relay, wherein the relay has a coverage footprint and provides service on a first air interface having a frequency bandwidth, and wherein the relay is served by a donor access node over a second air interface on which the donor access node provides service, the computing system comprising:

at least one processing unit;

at least one non-transitory data storage;

program instructions stored in the at least one non-transitory data storage and executable by the at least one processing unit to carry out operations including:

detecting that load on the second air interface on which the donor access node provides service is threshold high, wherein the second air interface on which the donor access node provides service comprises at least one carrier and defines air-interface resources for carrying communications, and wherein detecting that load on the second air interface is threshold high comprises detecting that at least a predetermined threshold high percentage of the air-interface resources are used per unit time; and responsive to at least the detecting that the load on the second air interface on which the donor access node provides service is threshold high, causing the relay to perform at least one action comprising reducing the frequency bandwidth of the first air interface on which the relay provides service, wherein the relay continues to provide service after performing the at least one action.

15. The computing system of claim 14, wherein detecting that load on the second air interface on which the donor access node provides service is threshold high is based on reporting from the donor access node, and wherein the causing of the relay to perform the at least one action comprises the signaling to the relay to cause the relay to perform the at least one action.

16. The computing system of claim 15, wherein the at least one action that the relay is caused to perform responsive to at least the detecting that the load on the second air interface on which the donor access node provides service is threshold high further comprises the reducing the coverage footprint of the relay.

17. The computing system of claim 15, wherein the relay provides service on multiple carriers, and wherein reducing the frequency bandwidth comprises discontinuing service by the relay on a proper subset of the multiple carriers.

18. An access node operable in a wireless communication system in which a relay has a coverage footprint and provides service on a first air interface, the access node being configured to serve the relay over a second air interface on which the access node provides service, the access node comprising:

an antenna structure through which the access node is configured to communicate on the second air interface; and a controller configured to carry out operations including (a) detecting that resource utilization on the second air interface on which the access node provides service is threshold high, wherein the second air interface on which the access node provides service comprises at least one carrier and defines air-interface resources for carrying communications, and wherein detecting that resource utilization on the second air interface is threshold high comprises detecting that at least a predetermined threshold high percentage of the air-interface resources are used per unit time and (b) responsive to at least the detecting that the resource utilization on the second air interface on which the access node provides service is threshold high, causing the relay to perform at least one action comprising reducing the frequency bandwidth of the first air interface on which the relay provides service, wherein the relay continues to provide service after performing the at least one action.

19. The access node of claim 18, wherein the at least one action further comprises reducing the coverage footprint of the relay.

* * * * *